Feb. 21, 1950  H. M. CARLSON  2,497,978
ORIFICE PLATE
Filed Jan. 12, 1946

INVENTOR
H. Maurice Carlson

BY  R. R. Adams
    M. B. Lilly
        Agents

Patented Feb. 21, 1950

2,497,978

UNITED STATES PATENT OFFICE 2,497,978

ORIFICE PLATE

Henning Maurice Carlson, Columbus, Ohio, assignor, by mesne assignments, to Bituminous Coal Research, Inc., Pittsburgh, Pa., a corporation of Delaware Application January 12, 1946, Serial No. 640,933

3 Claims. (Cl. 138—44)

This invention relates to orifice plates and particularly to orifice plates to be used in connection with fluid systems comprising a mixture of gas and finely divided solid particles. It has for its principal object the production of orifice plates characterized by their ability to prevent packing of finely divided particles around the leading edge thereof.

The industrial employment of fluid mixtures comprising finely divided solid particles and gas, hereinafter referred to as "solid-gas" mixtures, has increased in recent years due in part to the increased use of pulverized coal and other pulverized solid fuels. Until the recent development of a coal measuring device by R. B. Engdahl, described in his application Serial No. 640,904, filed January 12, 1946, now Patent No. 2,439,723, no successful method of continuously measuring the amount of coal being delivered to a burner had as yet been devised. Hand control of the burner was, therefore, necessary and only through costly experience and constant observation could such a burner be regulated to give off the correct amount of heat over a long period of time. In the development of apparatus such as the Engdahl device, referred to above, the primary problem was to obviate the packing of the coal dust particles around the leading edge of the metal orifice plate used to measure the rate of air flow. Since these dust particles tended to alter the shape and size of the orifice, the measurements based thereon were continually changing and no accurate data could be obtained after the device had been in use for any considerable period of time. It was further discovered that the solid particles in the fluid mixture caused erosion of the leading edge of the orifice, where an ordinary brass orifice plate was used to such an extent that such a plate would not function properly as part of a flow meter, or the like, over an extended period of time.

The present invention in general comprises an orifice plate of metal or other suitable material having a facing of a resilient rubber-like material. In the accompanying drawings, Figure 1 is a perspective view of an orifice plate and Figure 2 is a schematic illustration in cross-section of an orifice plate forming part of a flow meter.

Figure 1:
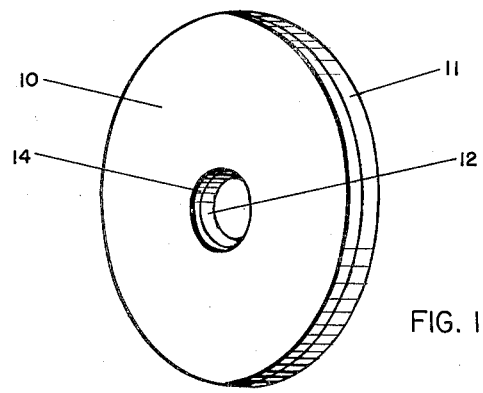
Figure 2:
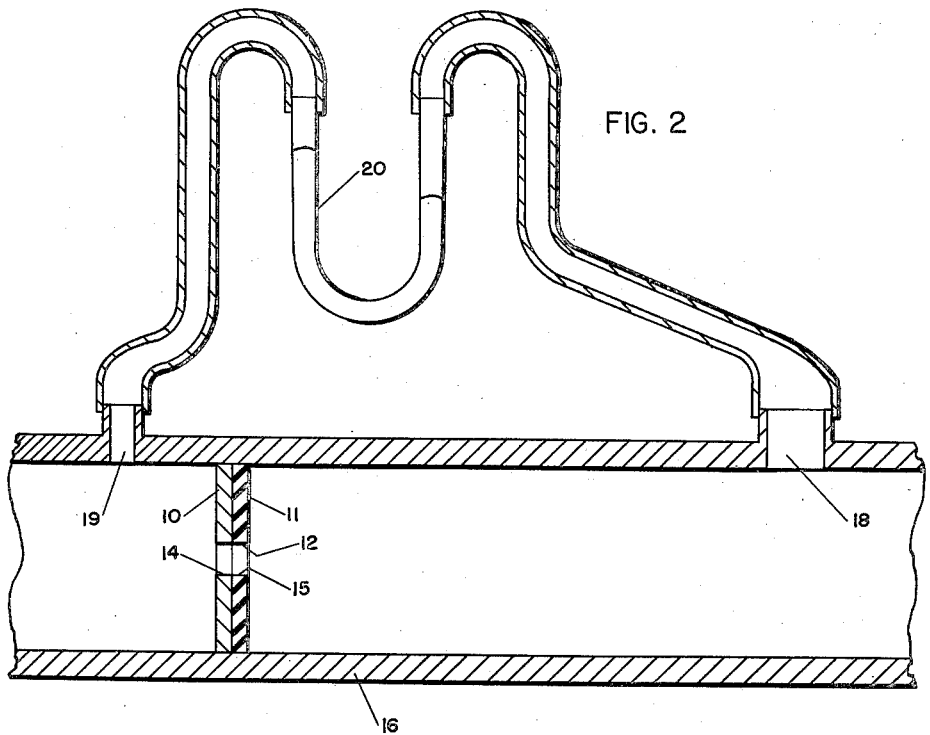

In Figure 1, a backing plate 10 is composed generally of a suitable metal, although other materials having sufficient rigidity may be employed. A facing 11 is bonded to the plates 10 in any convenient or conventional manner. A number of materials may be successfully employed as the facing 11, such as rubber, elastomers, generally referred to as synthetic rubbers, and plastics having characteristics similar to rubber in that they are elastic and resilient. For the purposes of this invention, this group of materials is included within the term "rubber-like." The facing 11 is applied to the plate 10 in such a manner that an aperture 12 in the facing 11 coincides with an aperture 14 in plate 10. These apertures are of identical size and are formed in such a manner that the leading edge of the aperture 12, as indicated at 15, is relatively sharp. When the orifice plate is employed in a flow meter, as shown in Figure 2, the backing plate 10 is rigidly affixed about its periphery to a pipe 16 through which the fluid to be measured flows. Taps 18 and 19, positioned in front of and behind the orifice plate, respectively, lead to a manometer 20 which registers difference in pressure between the free flow admitted to the manometer 20 through the tap 18 and the constricted flow admitted to the manometer 20 through the tap 19. Knowing the size of the apertures 12 and 14, the rate of flow, calculated in weight of material may be easily determined from the pressure differential registered by the manometer 20.

A slight variation either in the size of the aperture in the orifice plate or in the configuration of the leading edge of the orifice indicated at 15, prevents accurate calculation of the rate of flow from being made. As previously stated, metal orifice plates formerly employed to measure the flow of fluid through a pipe, were not satisfactory for measuring the flow of solid-gas mixtures, because the solid material tended to pack about the edge of the orifice so as to alter the flow characteristics thereof. It was found that the solid particles rebound from, or are repelled by, the resilient facing 11 and do not pack around the leading edge of the orifice plate so as to alter the flow characteristics of the orifice 12. In the present invention, moreover, the leading edge 15 is composed of a rubber-like material and has far greater resistance to mechanical abrasion than does brass or similar rigid materials. Consequently, orifice plates comprising the present invention may be used over long periods of time in flow meters designed for employment with solid-gas and solid-liquid mixtures without varying their accuracy.

Variations and modifications of the present invention will become apparent to those skilled in the art. For example, it is not essential for purposes of this invention that the particular type of orifice plate disclosed in the accompanying drawings be employed.

What is claimed is:

1. A flow-regulating device for fluid systems through which a mixture of gas and finely divided solid particles flows, comprising in combination with a substantially unrestricted flow passage, a flow-restricting device disposed in the flow passage and including a rigid plate positioned across the passage, said rigid plate having a flow opening therein, and a rubber-like facing disposed on the side of said rigid plate which is toward the direction of flow whereby to provide a surface from which the solid particles will rebound, said rubber-like facing having a flow opening therethrough coincidental with and of substantially the same size as the flow opening through said rigid plate.

2. A flow-regulating device for fluid systems through which a mixture of gas and finely divided solid particles flows, comprising in combination with a substantially unrestricted flow passage, a flow-restricting device disposed in the flow passage and including a rigid plate positioned across the passage, said rigid plate having a flow opening therein, and a rubber-like facing disposed on the side of said rigid plate which is toward the direction of flow whereby to provide a surface from which the solid particles will rebound, said rubber-like facing having a flow opening therethrough coincidental with and of substantially the same size as the flow opening to said rigid plate, the leading edge of the flow opening through the rubber-like facing being relatively sharp.

3. A flow-regulating device for fluid systems through which a mixture of gas and finely divided solid particles flows, comprising in combination with a substantially unrestricted flow passage, a flow-restricting device disposed in the flow passage and including a rigid plate positioned across the passage, said rigid plate having a flow opening positioned centrally therein and of a diameter substantially less than the diameter of the substantially unrestricted flow passage, and a rubber-like facing disposed on the side of said rigid plate which is toward the direction of flow whereby to provide a surface from which the solid particles will rebound, said rubber-like facing having a flow opening therethrough coincidental with and of substantially the same size as the flow opening through said rigid plate, the leading edge of the flow opening through the rubber-like facing being relatively sharp.

HENNING MAURICE CARLSON.

REFERENCES CITED

The following references are of record in the file of this patent:

UNITED STATES PATENTS

| Number | Name | Date |
|---|---|---|
| 1,393,562 | Matthews | Oct. 11, 1921 |
| 1,890,536 | Flanders et al. | Dec. 13, 1932 |
| 1,938,475 | Alexander | Dec. 5, 1933 |
| 1,967,182 | Allen | July 17, 1934 |
| 2,223,242 | Sweet | Nov. 26, 1940 |
| 2,230,959 | Law | Feb. 4, 1941 |
| 2,232,648 | Allen | Feb. 18, 1941 |
| 2,277,937 | Shryer | Mar. 31, 1942 |
| 2,454,929 | Kempton | Nov. 30, 1948 |